US006767858B1

(12) United States Patent
Cao et al.

(10) Patent No.: US 6,767,858 B1
(45) Date of Patent: Jul. 27, 2004

(54) SYNTHESIS OF ALUMINO- AND SILICOALUMINO-PHOSPHATES OF CHA FRAMEWORK TYPE

(75) Inventors: Guang Cao, Branchburg, NJ (US); Matu J. Shah, Livingston, NJ (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 10/370,932

(22) Filed: Feb. 20, 2003

(51) Int. Cl.[7] .................. B01J 27/182; C01B 39/54
(52) U.S. Cl. .................. 502/214; 502/208; 423/328.1; 423/328.2; 423/329.1
(58) Field of Search ................. 502/214; 423/328.1, 423/328.2, 329.1

(56) References Cited

U.S. PATENT DOCUMENTS

| 4,310,440 | A | 1/1982 | Wilson et al. ............... 252/435 |
| 4,440,871 | A | 4/1984 | Lok et al. ................... 502/214 |
| 4,786,487 | A | 11/1988 | Kuehl ........................ 423/306 |
| 4,861,739 | A | 8/1989 | Pellet et al. .................. 502/64 |
| 5,096,684 | A | 3/1992 | Guth et al. .................. 423/306 |
| 6,001,328 | A | 12/1999 | Lillerud et al. ............. 423/718 |
| 6,162,415 | A | 12/2000 | Liu et al. ..................... 423/706 |

FOREIGN PATENT DOCUMENTS

EP  0 993 867  4/2000  ............ B01J/29/85

Primary Examiner—Elizabeth D. Wood

(57) ABSTRACT

The invention is directed to a method of synthesizing aluminophosphate and silicoaluminophosphate molecular sieves and in particular to the synthesis of aluminophosphate and silicoaluminophosphate molecular sieves using N-methylethanolamine as template with or without a source of fluoride. The use of N-methylethanolamine as template results in good quality $AlPO_4$ of CHA framework type and SAPO molecular sieves of CHA framework type with low levels of silicon in high yield.

61 Claims, 5 Drawing Sheets

SYNTHESIS OF ALUMINO- AND SILICOALUMINO-PHOSPHATES OF CHA FRAMEWORK TYPE

FIELD OF INVENTION

This invention relates to the synthesis of aluminophosphate and silicoaluminophosphate molecular sieves of the CHA framework type. In particular, the present invention relates to the synthesis of aluminophosphate and silicoaluminophosphate molecular sieves of the CHA framework type using N-methylethanolamine as synthesis template.

BACKGROUND OF THE INVENTION

Olefins are traditionally produced from petroleum feedstock by catalytic or steam cracking processes. These cracking processes, especially steam cracking, produce light olefin(s) such as ethylene and/or propylene from a variety of hydrocarbon feedstocks. It has been known for some time that oxygenates, especially alcohols, e.g. methanol, are convertible into light olefin(s). The preferred methanol conversion process is generally referred to as the methanol-to-olefin(s) (MTO) process, where methanol is converted to primarily ethylene and propylene in the presence of a molecular sieve.

Some of the most useful molecular sieves for converting methanol to olefin(s) are the metalloaluminophosphates such as the silicoaluminophosphates (SAPO's). There are a wide variety of SAPO molecular sieves known in the art. Of these, the more important examples include SAPO-5, SAPO-11, SAPO-18, SAPO-34, SAPO-35, SAPO-41, and SAPO-56. For the MTO process, SAPO molecular sieves having the CHA framework type ("Atlas of Zeolite Framework Types", 2001, 5th Edition, p.96) and especially SAPO-34 are particularly important catalysts. The CHA framework type has a double six-ring structure in an ABC stacking arrangement. The pore openings of the structure are defined by eight-member rings that have a diameter of about 4.0 Å and cylindrical cages within the structure of approximately 10×6.7 Å. Other SAPO molecular sieves of CHA framework type include SAPO-44, SAPO-47 and ZYT-6.

The synthesis of $AlPO_4$ and SAPO molecular sieves is a complicated process. A number of variables need to be controlled to optimise the synthesis in terms of the purity, yield, and quality of the molecular sieve produced. Of these variables, the choice of synthesis template is usually one of the most important in determining which framework type is obtained.

One desirable group of SAPO molecular sieves are those which have low silicon content. SAPOs of the CHA framework type with low silicon content are particularly desirable for use in the MTO process. Wilson, et al., reported that it is beneficial to have lower Si content for methanol-to-olefins reaction (*Microporous and Mesoporous Materials*, 29, 117–126, 1999). Low Si content has the effect of reducing propane formation and decreasing catalyst deactivation.

$AlPO_4$ and SAPO molecular sieves having the CHA framework type may be represented as [Al—P—O]—CHA and [Si—Al—P—O]—CHA according to nomenclature proposed by L. B. McCusker et.al. (Proposal to IUPAC; L. B. McCusker, F. Liebau and G. Engelhardt, *Pure Appl. Chem.* 73 (2) 381–394, 2001).

In U.S. Pat. No. 4,440,871, (Lok et.al) the synthesis of a wide variety of SAPO materials of various framework types is described with a number of specific examples. Also disclosed are a large number of possible organic templates, with some specific examples. In the specific examples, a number of CHA framework type materials are described. SAPO-34 is prepared utilizing tetraethylammonium hydroxide (TEAOH) or isopropylamine, or mixtures of TEAOH and dipropylamine (DPA). This is believed to be the first reported synthesis of a SAPO having the CHA framework type. Also disclosed in this patent is a specific example that utilizes cyclohexylamine in the preparation of SAPO-44. Although other template materials are described in this patent, there are no other templates indicated as being suitable for preparing SAPO's of CHA framework type. Certain aminoalcohols are mentioned, including triethanolamine, N-methyldiethanolamine, N-methylethanolamine, N,N-dimethylethanolamine and N,N-diethylethanolamine as possible templates for SAPO molecular sieves. Of these materials, N,N-diethylethanolamine is shown to produce SAPO-5, which is of framework type AFI. For the other aminoalcohols, no indication is provided as to which SAPO or which framework type may be obtained through their use.

Since the synthesis of SAPO-34 was reported in U.S. Pat. No. 4,440,871, TEAOH, either alone or in combination with DPA, has been the template of choice for preparing SAPO having the CHA framework type. However, there are problems associated with the use of TEAOH and DPA. When used alone, TEAOH affords a limited range of synthesis parameters. For example, under certain conditions, TEAOH will also template the synthesis of SAPO-18, which has the AEI framework type. TEAOH is thus relatively intolerant to synthesis condition variations. TEAOH is sometimes combined with DPA. However, DPA has a low boiling point (110° C.), resulting in the need for production plants that can handle high pressures. In certain countries, the use of DPA requires special regulatory authorizations due to its toxicity. Also, DPA is an aggressive template and is often implicated in re-dissolution of the SAPO molecular sieve during its synthesis, resulting in poor quality crystalline product due to surface pitting of the crystals.

In U.S. Pat. No. 4,440,871, it was reported that SAPO-44 was obtained "as the major phase" using cyclohexylamine as template. In U.S. Pat. No. 6,162,415 (Liu, et.al.), relatively pure CHA SAPO-44 was obtained using the same template but with control of the ratio of template to aluminum component and the ratio of phosphorous component to aluminum component.

In European Patent Publication No. 0,993,867, it was reported that the use of methylbutylamine resulted in SAPO-47, and the use of cyclohexylamine resulted in impure SAPO-44. Methylbutylamine has an even lower boiling point, at 91° C., than DPA.

In U.S. Pat. No. 4,861,739 (Pellet, et al.), Example 102, it was reported that the use of N,N-diethylethanolamine produced CoAPSO-47, having Si concentrated on the peripheries of the crystal and Co at the center.

In U.S. Pat. No. 4,310,440 (Wilson et.al), triethanolamine, N,N-dimethylethanolamine, N,N-diethylethanolamine, N-methyldiethanolamine, and N-methylethanolamine, were all used to prepare AlPO-5, aluminophosphates of framework type AFI. N-methylethanolamine was also reported to produce $AlPO_4$-21 of framework type AWO.

In European Patent Publication No. 0,993,867, it was reported that diethanolamine produced SAPO-34 and SAPO-5 under different synthesis conditions.

In the art, various attempts have been made to improve the synthesis of $AlPO_4$ or SAPO molecular sieves. One approach has been the use of fluoride addition to the synthesis.

In U.S. Pat. No. 5,096,684 (Guth et.al.), morpholine and TEAOH were found to template the production of SAPO-34 when in the presence of HF. According to Guth et.al., the use of HF in combination with the organic template results in SAPOs which have improved thermal and hydrolytic stability.

In U.S. Pat. No. 4,786,487 (Kuehl et.al.), SAPO-20 was produced from synthesis mixtures containing tetramethylammonium hydroxide and fluoride ions from water soluble sources of fluoride such as Na, K and ammonium fluoride.

In U.S. Pat. No. 6,001,328 (Lillerud et.al.), SAPO indicated as UiO-S7 was prepared using tetramethylammonium hydroxide pentahydrate or tetramethylammonium hydroxide, in combination with HF.

In a Ph.D. thesis (E. H. Halvorsen, University of Oslo, 1996), it was reported that low silica SAPO-34, designated as UiO-S4, was produced using TEAOH template in combination with HF.

As can bee seen from the disclosures described herein, there have been a number of attempts to find alternative synthesis templates for the CHA framework type with limited success. It is desirable therefore to find new synthesis templates, template systems and synthesis conditions that are specific for the synthesis of CHA framework type. In addition, there is a need for new templating systems which afford more effective control of the final composition of the SAPO molecular sieve materials and in particular the Si content of the final product. In addition, a further need is to obtain SAPO materials having the CHA framework type that have a low acid density and a low silica content. There is also a need for synthetic methods that produce aluminophosphates and/or silicoaluminophosphates in relatively high yields.

SUMMARY OF THE INVENTION

The present invention provides a process for preparing microporous crystalline aluminophosphate ("AlPO") or SAPO molecular sieves of CHA framework type, the process comprising:

(a) forming a reaction mixture comprising a source of aluminum, a source of phosphorous, optionally a source of silicon and at least one template, the template comprising N-methylethanolamine;

(b) inducing crystallization of AlPO and/or SAPO from the reaction mixture, and (c) recovering aluminophosphate and/or silicoaluminophosphate molecular sieve, wherein the mole ratio of template to aluminum in the reaction mixture is greater than 0.5.

The process of the present invention results in new molecular sieve materials, which, as synthesized, have unique X-ray diffraction (XRD) patterns. Thus, the process of the present invention provides for a variety of new materials that have the XRD patterns as described below.

In one embodiment, there is provided an AlPO or SAPO molecular sieve, substantially of CHA framework type, comprising within its intra-crystalline structure N-methylethanolamine.

In another embodiment, there is provided a composition of a microporous crystalline SAPO molecular sieve, which has a characteristic XRD pattern containing at least the d-spacings as set forth in Table I:

TABLE I

| 2 θ | d (Å) | I (%) |
|---|---|---|
| 9.46 | 9.34 | 59 |
| 12.82 | 6.90 | 22 |
| 13.94 | 6.35 | 13 |
| 15.96 | 5.55 | 41 |
| 17.72 | 5.00 | 25 |
| 18.96 | 4.68 | 3 |
| 20.52 | 4.32 | 100 |
| 21.98 | 4.04 | 20 |
| 22.32 | 3.98 | 5 |
| 22.98 | 3.87 | 23 |
| 24.88 | 3.58 | 67 |
| 25.82 | 3.45 | 30 |
| 27.56 | 3.23 | 8 |
| 28.12 | 3.17 | 6 |
| 29.46 | 3.03 | 3 |
| 30.52 | 2.93 | 63 |
| 30.74 | 2.91 | 18 |
| 31.00 | 2.88 | 28 |
| 31.52 | 2.84 | 7 |
| 33.42 | 2.68 | 5 |
| 34.40 | 2.60 | 9 |
| 34.86 | 2.57 | 3 |
| 35.98 | 2.50 | 7 |
| 39.58 | 2.28 | 7 |

It is preferred that the composition as identified in Table I comprises N-methylethanolamine within its intra-crystalline structure.

In a further embodiment, there is provided an AlPO or SAPO molecular sieve, substantially of CHA framework type, comprising within its intra-crystalline structure N-methylethanolamine and fluoride.

In a further embodiment, there is provided a composition of a microporous crystalline SAPO molecular sieve which has a characteristic XRD pattern containing at least the d-spacings as set forth in Table II:

TABLE II

| 2 θ | d (Å) | I (%) |
|---|---|---|
| 9.60 | 9.20 | 100 |
| 12.30 | 7.19 | 9 |
| 13.26 | 6.67 | 15 |
| 13.62 | 6.50 | 10 |
| 13.90 | 6.37 | 31 |
| 14.02 | 6.31 | 13 |
| 15.16 | 5.84 | 25 |
| 16.10 | 5.50 | 46 |
| 17.80 | 4.98 | 28 |
| 18.16 | 4.88 | 39 |
| 19.28 | 4.60 | 7 |
| 19.94 | 4.45 | 18 |
| 20.16 | 4.40 | 16 |
| 21.24 | 4.18 | 38 |
| 21.50 | 4.13 | 6 |
| 21.88 | 4.06 | 68 |
| 22.20 | 4.00 | 9 |
| 23.58 | 3.77 | 8 |
| 23.78 | 3.74 | 13 |
| 24.90 | 3.57 | 40 |
| 25.78 | 3.45 | 42 |
| 26.08 | 3.41 | 14 |
| 26.72 | 3.33 | 11 |
| 28.04 | 3.18 | 12 |
| 28.72 | 3.11 | 7 |
| 30.06 | 2.97 | 17 |
| 30.62 | 2.92 | 15 |
| 30.90 | 2.89 | 6 |
| 31.40 | 2.85 | 26 |
| 32.40 | 2.76 | 5 |
| 32.68 | 2.74 | 26 |
| 33.28 | 2.69 | 11 |

TABLE II-continued

| 2 θ | d (Å) | I (%) |
|---|---|---|
| 34.80 | 2.58 | 6 |
| 40.96 | 2.20 | 6 |

It is preferred that the composition as identified in Table II comprises N-methylethanolamine and fluoride within its intra-crystalline structure.

In a further embodiment, the present invention provides a process for preparing microporous crystalline AlPO or SAPO molecular sieves of CHA framework type, in which process a source of fluoride is present in the reaction mixture in combination with N-methylethanolamine.

In another embodiment, the present invention provides a method for the manufacture of a formulated catalyst composition, the method comprising forming a mixture comprising at least one microporous crystalline SAPO molecular sieve of CHA framework type comprising within its intra-crystalline structure N-methylethanolamine or as obtained from a process utilizing a template comprising N-methylethanolamine, with at least one formulating agent, to form a catalyst composition. In a further embodiment, fluoride is also present in the intra-crystalline structure.

In yet a further embodiment, the present invention provides for a formulated molecular sieve composition comprising at least one microporous crystalline SAPO molecular sieve of CHA framework type comprising within its intra-crystalline structure N-methylethanolamine or as obtained from a process utilizing a template comprising N-methylethanolamine, in admixture with at least one formulating agent. In a further embodiment, fluoride is also present in the intra-crystalline structure.

In a further embodiment, the present invention provides for the use of a template comprising N-methylethanolamine in the synthesis of AlPO or SAPO of CHA framework type. In a further embodiment, the present invention provides for the use of a template comprising N-methylethanolamine in combination with a source of fluoride ions in the synthesis of AlPO or SAPO of CHA framework type.

BRIEF DESCRIPTION OF THE DRAWINGS

The present invention will be better understood by reference to the Detailed Description of the Invention when taken together with the attached drawings wherein.

DETAILED DESCRIPTION OF THE INVENTION

Introduction

Figure 1:
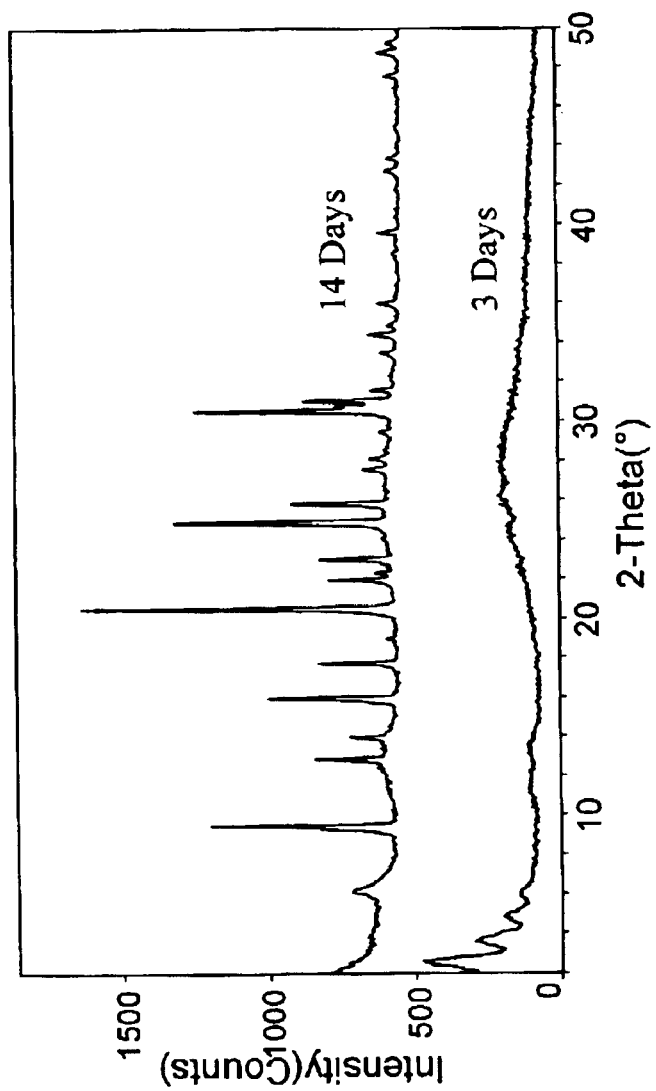
FIG. 1 shows the XRD pattern of a SAPO molecular sieve produced from a gel containing N-methylethanolamine after 3 and 14 days crystallization at 170° C. under static conditions.

The invention is primarily directed toward a method for synthesising aluminophosphate (AlPO's) and silicoaluminophosphates (SAPO's) of the CHA framework type. In particular, it has been found that when a template is used which comprises a specific organic amine, namely N-methylethanolamine (2-methylaminoethanol), then it is highly effective as a synthesis template for AlPO or SAPO's of the CHA framework type. Through the use of a template comprising this amine, it is possible to prepare AlPO or SAPO's of CHA framework type without also introducing significant impurities of other framework types. It has also been found that if N-methylethanolamine is used in combination other templates and/or with a source of fluoride, then AlPO or SAPO's of CHA framework type with low silica content can be obtained.

Catalysts containing the molecular sieves obtained by the method of the present invention are particularly useful for methanol-to-olefins conversions.

Silicoaluminophosphates

The AlPO or SAPO molecular sieves of the present invention, when prepared using a template comprising N-methylethanolamine in the absence of a source of fluoride, may be represented by the empirical formula, on an anhydrous basis:

$$mR:(Si_xAl_yP_z)O_2$$

wherein R represents templating agent comprising N-methylethanolamine; m is the number of moles of R per mole of $(Si_xAl_yP_z)O_2$ and m has a value from 0.0417 to 0.3333, preferably from 0.0833 to 0.25, and most preferably from 0.125 to 0.1667; and x, y, and z respectively represent the mole fraction of Si, Al, and P as tetrahedral oxides.

In one embodiment, m is greater than or equal to 0.04, and x, y and z are greater than or equal to 0.01. In another embodiment, m is in the range of from greater than 0.01 to about 1, x is in the range of from 0 to about 0.31, y is in the range of from 0.25 to 1.0, and z is in the range of from 0.25 to 0.9. More preferably, m is in the range of from 0.1 to 0.25, x is in the range of from 0.01 to 0.2, most preferably from 0.01 to 0.2, y is in the range of from 0.4 to 1.0, and z is in the range of from 0.3 to 0.9. In relation to AlPO molecular sieves, the value of x will be zero.

In an embodiment, the reaction mixture also contains a source of fluoride. When fluoride is present, the AlPO or SAPO molecular sieves of the present invention may be represented by the empirical formula, on an anhydrous basis:

$$mR:F_a(Si_xAl_yP_z)O_2$$

wherein R represents templating agent comprising N-methylethanolamine; m is the number of moles of R per mole of $(Si_xAl_yP_z)O_2$ and m has a value from 0.0417 to 0.3333, preferably 0.0833 to 0.25, and most preferably from 0.125 to 0.1667; x, y, and z respectively represent the mole fraction of Si, Al and P as tetrahedral oxides; F indicates fluoride ion and "a" is the number of moles of F per mole of $(Si_xAl_yP_z)O_2$; "a" has a value between 0.001 to 0.167. For AlPO molecular sieves, x is zero.

In an embodiment, m is greater than or equal to 0.05, and x is less than or equal to 0.2, y and z are greater than or equal to 0.01. In another embodiment, m is in the range from greater than 0.01 to about 0.4, x is less than or equal to 0.1, y is in the range of from 0.4 to 0.7, and z is in the range of from 0.25 to 0.9. More preferably, m is in the range of from 0.08 to 0.25, x is less than or equal to 0.08, y is in the range of from 0.4 to 0.6, and z is in the range of from 0.3 to 0.5. Preferably, when the molecular sieve is a SAPO, x is greater than or equal to 0.01.

When these frameworks are calcined, the organic template is removed and the resulting AlPO and SAPO's have a CHA framework type and are of substantially high purity in terms of their framework type, with little or no intergrowth with other SAPO or AlPO framework types. In the present specification, when reference is made to aluminophosphates or silicoaluminophosphates substantially of CHA framework type or of substantially high purity in terms of their framework type, it is meant an aluminophosphate or silicoaluminophosphate molecular sieve which comprises 60% or greater of the CHA framework type, preferably 70% or greater of CHA framework type and most preferably 90% or greater of the CHA framework type as determined by XRD.

It is also within the scope of the present invention to provide crystalline AlPO or SAPO molecular sieves, which are a mixture of two different framework types. In this embodiment, the molecular sieve may be an intergrowth material having two or more distinct phases of crystalline frameworks within one molecular sieve composition. In another embodiment, the molecular sieve comprises at least one intergrown phase of AEI and CHA framework types. For example, SAPO-18, AlPO$_4$-18 and RUW-18 have an AEI framework type, and SAPO-34 has a CHA framework type. In a further embodiment, the molecular sieve may comprise a mixture of intergrown material and non-intergrown materials.

As used herein, the term mixture is synonymous with combination and is considered a composition of matter having two or more components in varying proportions, regardless of their physical state. In particular, it encompasses physical mixtures as well as intergrowths of at least two different molecular sieve frameworks; such as, for example, those described in PCT Publication No. WO 98/15496 and copending U.S. Ser. No. 09/924016, filed Aug. 7, 2001.

When fluoride is used in their preparation, prior to calcination, the molecular sieves of the invention substantially have the CHA framework type, although the XRD patterns of the as-synthesized molecular sieves provide no immediate indication that these materials have the CHA framework type. However, when the molecular sieves are calcined, the resulting AlPO's or SAPO's have an XRD pattern typical of the CHA framework type and are of high purity in terms of their framework type. The molecular sieves prepared according to the present invention preferably have little or no intergrowth with other molecular sieve framework types.

Molecular Sieve Synthesis

Generally, alumino- or silicoaluminophosphate molecular sieves are synthesized by the hydrothermal crystallization of a source of aluminum, a source of phosphorous, a source of silicon for silicoaluminophosphate, and a templating agent. Typically, in the process of the present invention a combination of a source of aluminum, a source of phosphorous, N-methylethanolamine and optionally one or more additional templating agents and/or optionally one or more metal containing compounds and/or optionally a source of fluoride and/or optionally a source of silicon are placed in a sealed pressure vessel, optionally lined with an inert plastic such as polytetrafluoroethylene, and heated, under a crystallization pressure and temperature, until a crystalline material is formed, and then recovered by filtration, centrifugation and/or decanting.

In a typical synthesis of the molecular sieve, the phosphorous-, aluminum-, and/or silicon-containing components are mixed, preferably while stirring and/or agitation and/or seeding with a crystalline material, optionally with an alkali metal, in a solvent such as water, and the templating agents, to form a synthesis mixture. To this synthesis mixture or gel the fluoride source may be added when used. This mixture or gel is then heated under crystallization conditions of pressure and temperature as described, for example, in U.S. Pat. No. 4,440,871 which is fully incorporated by reference.

In a further embodiment, the template comprising N-methylethanolamine may be used with one or more additional templates normally used in the manufacture of SAPOs of CHA framework type. These additional templates include: the group of tetraethylammonium compounds, such as tetraethyl ammonium hydroxide (TEAOH), tetraethyl ammonium phosphate, tetraethyl ammonium fluoride, tetraethyl ammonium bromide, tetraethyl ammonium chloride and tetraethyl ammonium acetate, and also include DPA, isopropylamine, cyclohexylamine, methylbutylamine, morpholine, diethanolamine, and triethylamine. When these additional templates are used in combination with N-methylethanolamine it is possible to produce SAPOs of CHA framework type that have a low silicon/CHA cage ratio or more uniform silicon distribution or better crystal morphology, which is desirable when these materials are used as catalysts in the methanol-to-olefins process.

In the process of the present invention, a source of aluminum, typically alumina ($Al_2O_3$), a source of phosphorous, typically phosphate, and optionally a source of silicon, typically silica, are combined with the template and optionally a source of fluoride. Preferably, the mole ratio of fluoride to aluminum ($F^-$/aluminum) in the reaction mixture is in the range of from 0.05 to 0.75, more preferably in the range of from 0.05 to 0.5. Preferably, the mole ratio of fluoride to template is in the range of from 0.033 to 1.5, more preferably in the range of from 0.1 to 1.0.

In the process of the present invention when N-methylethanolamine is the sole organic nitrogen containing template, the mole ratio of N-methylethanolamine to aluminum in the reaction mixture is greater than 0.5, preferably 0.75 or greater and most preferably 1.0 or greater. Preferably when N-methylethanolamine is the sole organic nitrogen containing template, the mole ratio of N-methylethanolamine to aluminum in the reaction mixture is 2.0 or less, preferably 1.75 or less and most preferably 1.5 or less. When N-methylethanolamine is used in combination with additional nitrogen containing organic templates and/or with a source of fluoride, the mole ratio of N-methylethanolamine to aluminum in the reaction mixture can be less than 0.5. In this embodiment, the mole ratio of N-methylethanolamine to aluminum in the reaction mixture is 0.05 or greater, preferably 0.075 or greater, more preferably 0.1 or greater, more preferably 0.125 or greater, more preferably 0.5 or greater, more preferably 0.75 or greater and most preferably 1.0 or greater. In this embodiment, the mole ratio of total organic template to aluminum in the reaction mixture is 2.0 or less, preferably 1.75 or less and most preferably 1.5 or less.

It has been found that when an N-methylethanolamine-containing template is used in combination with fluoride ions, the resulting molecular sieves have an Si/CHA cage ratio within the range of from 0 to about 1.0 or from about 0.01 to about 1.0. An Si/CHA cage ratio of 1 means that there is one silicon atom per 12 T-atoms (6 aluminum atoms, 5 phosphorus atoms and 1 silicon atom) that constitute a CHA cage. It has also been found that when N-methylethanolamine is used in combination with one or more additional nitrogen containing templates in the absence of a source of fluoride, the resulting SAPOs have a Si/CHA cage ratio of approximately 1.0 or less. When TEAOH is used as the sole organic templating material, Si/CHA cage values approximating to 1 are usually obtained.

The preferred SAPOs of the present invention have a Si/CHA cage ratio of from 0.01 to 1.0, preferably of from 0.05 to 0.50, more preferably of from 0.10 to 0.45.

When N-methylethanolamine is utilized in combination with one or more additional organic nitrogen containing templates, it is preferred that at least one of the additional templates is one or more tetraethylammonium compounds as herein described.

In one preferred embodiment, when a templating agent with or without a source of fluoride is used in the synthesis of a molecular sieve, it is preferred that the templating agent and fluoride when present are substantially, preferably completely, removed after crystallization by numerous well known techniques, for example, heat treatments such as calcination. Calcination involves contacting the molecular sieve containing the templating agent with a gas, preferably containing oxygen, at any desired concentration at an elevated temperature sufficient to either partially or completely decompose and oxidize the templating agent and remove the fluoride.

In one embodiment, the calcined molecular sieve has a Si/Al mole ratio of from 0.01 to 0.1, preferably of from 0.02 to 0.08, more preferably of from 0.02 to 0.07.

The source of fluoride ions may be hydrogen fluoride. Other suitable sources of fluoride are fluorine containing compounds (hereinafter referred to as FCM) that have at least two fluorine substituents and are capable of being a source of fluoride. Ideally, they are compounds that are easily hydrolyzed under the normal synthesis conditions used for the manufacture of alumino- and silicoaluminophosphates. In this context, they will be compounds which are hydrolyzed at pH of <9 or at temperatures of greater than 50° C. or both. Examples of suitable compounds include $[(C_2H_5)_4N]PF_6$, $NaHF_2$, $(NH_4)HF_2$, $HPF_6NH_4PF_6$, $H_2SiF_6$, $(NH_4)_2SiF_6$, $NH_4HF_2$, $NaPF_6$, $AlF_3$ (anhydrous or hydrate), $(NH_4)_3AlF_6$, $(NH_4)_2TiF_6$, $(NH_4)_2ZrF_6$, $(NH_4)_2GeF_6$, and $(NH_4)_2SnF_6$. The fluoride source is preferably selected from $(NH_4)_2SiF_6$, $NH_4HF_2$, $HPF_6$, $H_2SiF_6$, $AlF_3$ (anhydrous or hydrate), $NH_4PF_6$, and $NaPF_6$, more preferably from $(NH_4)_2SiF_6$, $HPF_6$, $H_2SiF_6$, $AlF_3$ (anhydrous or hydrate), and $NH_4PF_6$.

The use of $NaHF_2$ can dramatically slow down the crystallization, possibly due to the presence of Na. $(NH_4)_2SiF_6$, whilst also being a potential source of silicon as well as fluoride, may require greater control during use as its order of addition may affect the composition of the final product. The use of $(NH_4)HF_2$ sometimes results in the simultaneous production of non-porous $AlPO_4$-15, which is not desirable. However, certain levels of $AlPO_4$-15 may be tolerated as this material is substantially inert under methanol-to-olefin conditions. The preferred fluorine containing compound is $HPF_6$, as it is effective and does not have similar problems to those identified for some of the fluorine containing compounds discussed above. The fluorine containing material (FCM) should be used at a mole ratio of FCM to aluminum of 0.005 or greater, preferably 0.01 or greater and most preferably 0.0175 or greater. Ideally, it is within the range of 0.005 to 0.25, preferably 0.01 to 0.125, and most preferably 0.0175 to 0.075.

Method for Making Molecular Sieve Catalyst Compositions

The AlPO and SAPO molecular sieves of the present invention may be combined with one or more formulating agents, to form a molecular sieve catalyst composition or a formulated molecular sieve catalyst composition. The formulating agents may be one or more materials selected from the group consisting of binding agents, matrix or filler materials, catalytically active materials and mixtures thereof. This formulated molecular sieve catalyst composition is formed into useful shape and sized particles by well-known techniques such as spray drying, pelletizing, extrusion, and the like.

There are many different binders that are useful in forming the molecular sieve catalyst composition. Non-limiting examples of binders that are useful alone or in combination include various types of hydrated alumina, silicas, and/or other inorganic oxide sol. One preferred alumina containing sol is aluminum chlorhydrol. The inorganic oxide sol acts like glue binding the synthesized molecular sieves and other materials such as the matrix together, particularly after thermal treatment. Upon heating, the inorganic oxide sol, preferably having a low viscosity, is converted into an inorganic oxide matrix component. For example, an alumina sol will convert to an aluminum oxide matrix following heat treatment.

Aluminum chlorhydrol, a hydroxylated aluminum based sol containing a chloride counter ion, has the general formula of $Al_mO_n(OH)_oCl_p \cdot x(H_2O)$, wherein m is 1 to 20, n is 1 to 8, o is 5 to 40, p is 2 to 15, and x is 0 to 30. In one embodiment, the binder is $Al_{13}O_4(OH)_{24}Cl_7 \cdot 12(H_2O)$ as is described in G. M. Wolterman, et al., Stud. Surf. Sci. and Catal., 76, pages 105–144 (1993), which is herein incorporated by reference. In another embodiment, one or more binders are combined with one or more other non-limiting examples of alumina materials such as aluminum oxyhydroxide, γ-alumina, boehmite, diaspore, and transitional aluminas such as α-alumina, β-alumina, γ-alumina, δ-alumina, ε-alumina, κ-alumina, and ρ-alumina, aluminum trihydroxide, such as gibbsite, bayerite, nordstrandite, doyelite, and mixtures thereof.

In another embodiment, the binders are alumina sols, predominantly comprising aluminum oxide, optionally including some silicon. In yet another embodiment, the binders are peptised alumina made by treating alumina hydrates such as pseudobohemite, with an acid, preferably an acid that does not contain a halogen, to prepare sols or aluminum ion solutions. Non-limiting examples of commercially available colloidal alumina sols include Nalco 8676 available from Nalco Chemical Co., Naperville, Ill., and Nyacol available from The PQ Corporation, Valley Forge, Pa.

The metalloaluminophosphate molecular sieve may be combined with one or more matrix material(s). Matrix matcrials are typically effective in reducing overall catalyst cost, act as thermal sinks assisting in shielding heat from the catalyst composition, for example during regeneration, densifying the catalyst composition, increasing catalyst strength such as crush strength and attrition resistance, and to control the rate of conversion in a particular process.

Non-limiting examples of matrix materials include one or more of the following: rare earth metals, metal oxides including titania, zirconia, magnesia, thoria, beryllia, quartz, silica or sols, and mixtures thereof, for example silica-magnesia, silica-zirconia, silica-titania, silica-alumina and silica-alumina-thoria. In one embodiment, matrix materials are natural clays such as those from the families of montmorillonite and kaolin. These natural clays include sabbentonites and those kaolins known as, for example, Dixie, McNamee, Georgia and Florida clays. Non-limiting examples of other matrix materials include: haloysite, kaolinite, dickite, nacrite, or anauxite. In one embodiment, the matrix material, preferably any of the clays, is subjected to well known modification processes such as calcination and/or acid treatment and/or chemical treatment.

In one preferred embodiment, the matrix material is a clay or a clay-type composition, preferably a clay or clay-type composition having a low iron or titania content, and most preferably the matrix material is kaolin. Kaolin has been found to form a pumpable, high solid content slurry; it has a low fresh surface area, and it packs together easily due to its platelet structure. A preferred average particle size of the matrix material, most preferably kaolin, is from about 0.1 $\mu$m to about 0.6 $\mu$m, with a D90 particle size distribution of less than about 1 $\mu$m.

In one embodiment, the binder, the molecular sieve and the matrix material are combined in the presence of a liquid to form a molecular sieve catalyst composition, where the amount of binder is from about 2% by weight to about 30% by weight, preferably from about 5% by weight to about 20% by weight, and more preferably from about 7% by weight to about 15% by weight, based on the total weight of the binder, the molecular sieve and matrix material, excluding the liquid (after calcination).

In another embodiment, the weight ratio of the binder to the matrix material used in the formation of the molecular sieve catalyst composition is from 0:1 to 1:15, preferably 1:15 to 1:5, more preferably 1:10 to 1:4, and most preferably 1:6 to 1:5. It has been found that a higher sieve content, lower matrix content, increases the molecular sieve catalyst composition performance; however, lower sieve content, higher matrix material, improves the attrition resistance of the composition.

Upon combining the molecular sieve and the matrix material, optionally with a binder, in a liquid to form a slurry, mixing, preferably rigorous mixing, is needed to produce a substantially homogeneous mixture containing the molecular sieve. Non-limiting examples of suitable liquids include one or a combination of water, alcohol, ketones, aldehydes, and/or esters. The most preferred liquid is water. In one embodiment, the slurry is colloid-milled for a period of time sufficient to produce the desired slurry texture, sub-particle size, and/or sub-particle size distribution.

The molecular sieve and matrix material, and the optional binder, may be in the same or different liquid, and may be combined in any order, together, simultaneously, sequentially, or a combination thereof. In the preferred embodiment, the same liquid, preferably water is used. The molecular sieve, matrix material, and optional binder, are combined in a liquid as solids, substantially dry or in a dried form, or as slurries, together or separately. If solids are added together as dry or substantially dried solids, it is preferable to add a limited and/or controlled amount of liquid.

In one embodiment, the slurry of the molecular sieve, binder and matrix materials is mixed or milled to achieve a sufficiently uniform slurry of sub-particles of the molecular sieve catalyst composition that is then fed to a forming unit that produces the molecular sieve catalyst composition. In a preferred embodiment, the forming unit is spray dryer. Typically, the forming unit is maintained at a temperature sufficient to remove most of the liquid from the slurry, and from the resulting molecular sieve catalyst composition. The resulting catalyst composition when formed in this way takes the form of microspheres.

When a spray drier is used as the forming unit, typically, the slurry of the molecular sieve and matrix material, and optionally a binder, is co-fed to the spray drying volume with a drying gas with an average inlet temperature ranging from 200° C. to 550° C., and a combined outlet temperature ranging from 100° C. to about 225° C. In an embodiment, the average diameter of the spray dried formed catalyst composition is from about 40 $\mu$m to about 300 $\mu$m, preferably from about 50 $\mu$m to about 250 $\mu$m, more preferably from about 50 $\mu$m to about 200 $\mu$m, and most preferably from about 65 $\mu$m to about 90 $\mu$m.

During spray drying, the slurry is passed through a nozzle distributing the slurry into small droplets, resembling an aerosol spray into a drying chamber. Atomization is achieved by forcing the slurry through a single nozzle or multiple nozzles with a pressure drop in the range of from 100 psia to 1000 psia (690 kPaa to 6895 kPaa). In another embodiment, the slurry is co-fed through a single nozzle or multiple nozzles along with an atomization fluid such as air, steam, flue gas, or any other suitable gas.

In yet another embodiment, the slurry described above is directed to the perimeter of a spinning wheel that distributes the slurry into small droplets, the size of which is controlled by many factors including slurry viscosity, surface tension, flow rate, pressure, and temperature of the slurry, the shape and dimension of the nozzle(s), or the spinning rate of the wheel. These droplets are then dried in a co-current or counter-current flow of air passing through a spray drier to form a substantially dried or dried molecular sieve catalyst composition, more specifically a molecular sieve in powder form.

Generally, the size of the powder is controlled to some extent by the solids content of the slurry. However, the size of the catalyst composition and its spherical characteristics are controllable by varying the slurry feed properties and conditions of atomization.

In another embodiment, the formulated molecular sieve catalyst composition contains from about 1% to about 99%, more preferably from about 5% to about 90%, and most preferably from about 10% to about 80%, by weight of the molecular sieve, based on the total weight of the molecular sieve catalyst composition.

In another embodiment, the weight percent of binder in or on the spray dried molecular sieve catalyst composition, based on the total weight of the binder, molecular sieve, and matrix material, is from about 2% by weight to about 30% by weight, preferably from about 5% by weight to about 20% by weight, and more preferably from about 7% by weight to about 15% by weight.

Once the molecular sieve catalyst composition is formed in a substantially dry or dried state, to further harden and/or activate the formed catalyst composition, a heat treatment such as calcination, at an elevated temperature is usually performed. A conventional calcination environment is air that typically includes a small amount of water vapor. Typical calcination temperatures are in the range from about 400° C. to about 1000° C., preferably from about 500° C. to about 800° C., and most preferably from about 550° C. to about 700° C., preferably in a calcination environment such as air, nitrogen, helium, flue gas (combustion product lean in oxygen), or any combination thereof.

In one embodiment, calcination of the formulated molecular sieve catalyst composition is carried out in any number of well known devices including rotary calciners, fluid bed calciners, batch ovens, and the like. Calcination time is typically dependent on the degree of hardening of the molecular sieve catalyst composition and the temperature.

In a preferred embodiment, the molecular sieve catalyst composition is heated in nitrogen at a temperature of from about 600° C. to about 700° C. Heating is carried out for a period of time typically from 30 minutes to 15 hours, preferably from 1 hour to about 10 hours, more preferably from about 1 hour to about 5 hours, and most preferably from about 2 hours to about 4 hours.

In addition to the metalloaluminophosphate molecular sieve, the catalyst compositions of the present invention may comprise one or several other catalytically active materials. In one embodiment, one or several metalloaluminophosphate molecular sieves are combined with one more of the following non-limiting examples of catalytically active molecular sieves described in the following: Beta (U.S. Pat. No. 3,308,069), ZSM-5 (U.S. Pat. Nos. 3,702,886, 4,797,267 and 5,783,321), ZSM-11 (U.S. Pat. No. 3,709,979), ZSM-12 (U.S. Pat. No. 3,832,449), ZSM-12 and ZSM-38 (U.S. Pat. No. 3,948,758), ZSM-22 (U.S. Pat. No. 5,336,478), ZSM-23 (U.S. Pat. No. 4,076,842), ZSM-34 (U.S. Pat. No. 4,086,186), ZSM-35 (U.S. Pat. No. 4,016,245), ZSM-48 (U.S. Pat. No. 4,397,827), ZSM-58 (U.S. Pat. No. 4,698,217), MCM-1 (U.S. Pat. No. 4,639,358), MCM-2 (U.S. Pat. No. 4,673,559), MCM-3 (U.S. Pat. No. 4,632,811), MCM-4 (U.S. Pat. No. 4,664,897), MCM-5 (U.S. Pat. No. 4,639,357), MCM-9 (U.S. Pat. No. 4,880,611), MCM-10 (U.S. Pat. No. 4,623,527), MCM-14 (U.S. Pat. No. 4,619,818), MCM-22 (U.S. Pat. No. 4,954,325), MCM-41 (U.S. Pat. No. 5,098,684), M-41S (U.S. Pat. No. 5,102,643), MCM-48 (U.S. Pat. No. 5,198,203), MCM-49 (U.S. Pat. No. 5,236,575), MCM-56 (U.S. Pat. No. 5,362,697), AlPO-11 (U.S. Pat. No. 4,310,440), titanium aluminosilicates (TASO), TASO-45 (EP-A-0 229,-295), boron silicates (U.S. Pat. No. 4,254,297), titanium aluminophosphates (TAPO) (U.S. Pat. No. 4,500,651), mixtures of ZSM-5 and ZSM-11 (U.S. Pat. No. 4,229,424), and ECR-18 (U.S. Pat. No. 5,278,345).

In another embodiment, the metalloaluminophosphate may be bound to another molecular sieve, as disclosed, for example, in the following: SAPO-34 bound AlPO$_4$-5 (U.S. Pat. No. 5,972,203), PCT WO 98/57743 published Dec. 23, 1988 (molecular sieve and Fischer-Tropsch), U.S. Pat. No. 6,300,535 (MFI-bound zeolites), and mesoporous molecular sieves (U.S. Pat. Nos. 6,284,696, 5,098,684, 5,102,643 and 5,108,725), which are all herein fully incorporated by reference. Binder may no longer be necessary in such systems.

In a further embodiment, the metalloaluminophosphate molecular sieve may be combined with a metal catalyst, for example as a Fischer-Tropsch catalyst.

Process For Using the Molecular Sieve Catalyst Compositions

The molecular sieve catalysts and compositions of the present invention are useful in a variety of processes including: cracking, hydrocracking, isomerization, polymerization, reforming, hydrogenation, dehydrogenation, dewaxing, hydrodewaxing, absorption, alkylation, transalkylation, dealkylation, hydrodecylization, disproportionation, oligomerization, dehydrocyclization and combinations thereof.

The preferred processes of the present invention include a process directed to the conversion of a feedstock comprising one or more oxygenates to one or more olefin(s) and a process directed to the conversion of ammonia and one or more oxygenates to alkyl amines and in particular methylamines.

In a preferred embodiment, the feedstock contains one or more oxygenates, more specifically, one or more organic compound(s) containing at least one oxygen atom. In the most preferred embodiment, the oxygenate in the feedstock is one or more alcohol(s), preferably aliphatic alcohol(s) where the aliphatic moiety of the alcohol has from 1 to 20 carbon atoms, preferably from 1 to 10 carbon atoms, and most preferably from 1 to 4 carbon atoms. The alcohols useful as feedstock in the process of the invention include lower straight and branched chain aliphatic alcohols and their unsaturated counterparts.

Non-limiting examples of oxygenates include methanol, ethanol, n-propanol, isopropanol, methyl ethyl ether, dimethyl ether, diethyl ether, di-isopropyl ether, formaldehyde, dimethyl carbonate, dimethyl ketone, acetic acid, and mixtures thereof.

In the most preferred embodiment, the feedstock is selected from one or more of methanol, ethanol, dimethyl ether, diethyl ether or a combination thereof, more preferably methanol and dimethyl ether, and most preferably methanol.

In the most preferred embodiment, the feedstock, preferably of one or more oxygenates, is converted in the presence of a molecular sieve catalyst composition into olefin(s) having 2 to 6 carbons atoms, preferably 2 to 4 carbon atoms. Most preferably, the olefin(s), alone or combination, are converted from a feedstock containing an oxygenate, preferably an alcohol, most preferably methanol, to the preferred olefin(s) ethylene and/or propylene.

The most preferred process is generally referred to as gas-to-olefins (GTO) or alternatively, methanol-to-olefins (MTO). In an MTO process, typically an oxygenated feedstock, most preferably a methanol-containing feedstock, is converted in the presence of a molecular sieve catalyst composition into one or more olefin(s), preferably and predominantly, ethylene and/or propylene, often referred to as light olefin(s).

In one embodiment of the process for conversion of a feedstock, preferably a feedstock containing one or more oxygenates, the amount of olefin(s) produced based on the total weight of hydrocarbon produced is greater than 50 weight percent, preferably greater than 60 weight percent, more preferably greater than 70 weight percent.

The feedstock, in one embodiment, contains one or more diluent(s), typically used to reduce the concentration of the feedstock, and are generally non-reactive to the feedstock or molecular sieve catalyst composition. Non-limiting examples of diluents include helium, argon, nitrogen, carbon monoxide, carbon dioxide, water, essentially non-reactive paraffins (especially alkanes such as methane, ethane, and propane), essentially non-reactive aromatic compounds, and mixtures thereof. The most preferred diluents are water and nitrogen, with water being particularly preferred.

The diluent, water, is used either in a liquid or a vapor form, or a combination thereof. The diluent is either added directly to a feedstock entering into a reactor or added directly into a reactor, or added with a molecular sieve catalyst composition. In one embodiment, the amount of diluent in the feedstock is in the range of from about 1 to about 99 mole percent based on the total number of moles of the feedstock and diluent, preferably from about 1 to 80 mole percent, more preferably from about 5 to about 50 mole percent, most preferably from about 5 to about 25 mole percent. In one embodiment, other hydrocarbons are added to a feedstock either directly or indirectly, and include olefin(s), paraffin(s), aromatic(s) (see for example U.S. Pat. No. 4,677,242, addition of aromatics) or mixtures thereof, preferably propylene, butylene, pentylene, and other hydrocarbons having 4 or more carbon atoms, or mixtures thereof.

The process for converting a feedstock, especially a feedstock containing one or more oxygenates, in the presence of a molecular sieve catalyst composition of the invention, is carried out in a reaction process in a reactor, where the process is a fixed bed process, a fluidized-bed process (includes a turbulent bed process), preferably a continuous fluidized-bed process, and most preferably a continuous high velocity fluidized-bed process.

The reaction processes can take place in a variety of catalytic reactors such as hybrid reactors that have a dense bed or fixed bed reaction zones and/or fast fluidized-bed reaction zones coupled together, circulating fluidized-bed reactors, riser reactors, and the like. Suitable conventional reactor types are described in, for example, U.S. Pat. No. 4,076,796 and U.S. Pat. No. 6,287,522 (dual riser), and Fluidization Engineering, D. Kunii and O. Levenspiel, Robert E. Krieger Publishing Company, New York, New York (1977), which are all herein fully incorporated by reference.

The preferred reactor type are riser reactors generally described in Riser Reactor, Fluidization and Fluid-Particle Systems, pages 48 to 59, F. A. Zenz and D. F. Othmo, Reinhold Publishing Corporation, New York (1960), and U.S. Pat. No. 6,166,282 (fast-fluidised bed reactor), and U.S. patent application Ser. No. 09/564,613 filed May 4, 2000 (multiple riser reactor), which are all herein fully incorporated by reference.

In the preferred embodiment, a fluidized-bed process or high velocity fluidized-bed process includes a reactor system, a regeneration system and a recovery system.

The reactor system preferably is a fluid bed reactor system having a first reaction zone within one or more riser reactor(s) and a second reaction zone within at least one disengaging vessel, preferably comprising one or more cyclones. In one embodiment, the one or more riser reactor(s) and disengaging vessel is contained within a single reactor vessel. Fresh feedstock, preferably containing one or more oxygenates, optionally with one or more diluent(s), is fed to the one or more riser reactor(s) in which a molecular sieve catalyst composition or coked version thereof is introduced. In one embodiment, the molecular sieve catalyst composition or coked version thereof is contacted with a liquid or gas, or combination thereof, prior to being introduced to the riser reactor(s), preferably the liquid is water or methanol, and the gas is an inert gas such as nitrogen.

In an embodiment, the amount of fresh feedstock fed separately or jointly with a vapor feedstock, to a reactor system is in the range of from 0.1 weight percent to about 85 weight percent, preferably from about 1 weight percent to about 75 weight percent, more preferably from about 5 weight percent to about 65 weight percent, based on the total weight of the feedstock including any diluent contained therein. The liquid and vapor feedstocks are preferably the same composition, or contain varying proportions of the same or different feedstock with the same or different diluent.

The feedstock entering the reactor system is preferably converted, partially or fully, in the first reactor zone into a gaseous effluent that enters the disengaging vessel along with a coked molecular sieve catalyst composition. In the preferred embodiment, cyclone(s) within the disengaging vessel are designed to separate the molecular sieve catalyst composition, preferably a coked molecular sieve catalyst composition, from the gaseous effluent containing one or more olefin(s) within the disengaging zone. Cyclones are preferred; however, gravity effects within the disengaging vessel will also separate the catalyst compositions from the gaseous effluent. Other methods for separating the catalyst compositions from the gaseous effluent include the use of plates, caps, elbows, and the like.

In one embodiment of the disengaging system, the disengaging system includes a disengaging vessel; typically a lower portion of the disengaging vessel is a stripping zone. In the stripping zone the coked molecular sieve catalyst composition is contacted with a gas, preferably one or a combination of steam, methane, carbon dioxide, carbon monoxide, hydrogen, or an inert gas such as argon, preferably steam, to recover adsorbed hydrocarbons from the coked molecular sieve catalyst composition that is then introduced to the regeneration system. In another embodiment, the stripping zone is in a separate vessel from the disengaging vessel and the gas is passed at a gas hourly superficial velocity (GHSV) of from 1 $hr^{-1}$ to about 20,000 $hr^{-1}$ based on the volume of gas to volume of coked molecular sieve catalyst composition, preferably at an elevated temperature from 250° C. to about 750° C., preferably from about 350° C. to 650° C., over the coked molecular sieve catalyst composition.

The conversion temperature employed in the conversion process, specifically within the reactor system, is in the range of from about 200° C. to about 1000° C., preferably from about 250° C. to about 800° C., more preferably from about 250° C. to about 750° C., yet more preferably from about 300° C. to about 650° C., yet even more preferably from about 350° C. to about 600° C., and most preferably from about 350° C. to about 550° C.

The conversion pressure employed in the conversion process, specifically within the reactor system, varies over a wide range including autogenous pressure. The conversion pressure is based on the partial pressure of the feedstock exclusive of any diluent therein. Typically the conversion pressure employed in the process is in the range of from about 0.1 kPa to about 5 Mpa, preferably from about 5 kPa to about 1 MPa, and most preferably from about 20 kPa to about 500 kPa.

The weight hourly space velocity (WHSV), particularly in a process for converting a feedstock containing one or more oxygenates in the presence of a molecular sieve catalyst composition within a reaction zone, is defined as the total weight of the feedstock excluding any diluents to the reaction zone per hour per weight of molecular sieve in the molecular sieve catalyst composition in the reaction zone. The WHSV is maintained at a level sufficient to keep the catalyst composition in a fluidized state within a reactor.

Typically, the WHSV ranges from about 1 $hr^{-1}$ to about 5000 $hr^{-1}$, preferably from about 2 $hr^{-1}$ to about 3000 $hr^{-1}$, more preferably from about 5 $hr^{-1}$ to about 1500 $hr^{-1}$, and most preferably from about 10 $hr^{-1}$ to about 1000 $hr^{-1}$. In one preferred embodiment, the WHSV is greater than 20 $hr^{-1}$; preferably the WHSV for conversion of a feedstock containing methanol and dimethyl ether is in the range of from about 20 $hr^{-1}$ to about 300 $hr^{-1}$.

The superficial gas velocity (SGV) of the feedstock including diluent and reaction products within the reactor system is preferably sufficient to fluidize the molecular sieve catalyst composition within a reaction zone in the reactor. The SGV in the process, particularly within the reactor system, more particularly within the riser reactor(s), is at least 0.1 meter per second (m/s), preferably greater than 0.5 m/s, more preferably greater than 1 m/s, even more preferably greater than 2 m/s, yet even more preferably greater than 3 m/s, and most preferably greater than 4 m/s. See, for example, U.S. patent application Ser. No. 09/708,753 filed Nov. 8, 2000, which is herein incorporated by reference.

In one preferred embodiment of the process for converting an oxygenate to olefin(s) using a SAPO molecular sieve catalyst composition, the process is operated at a WHSV of at least 20 $hr^{-1}$ and a Temperature Corrected Normalized Methane Selectivity (TCNMS) of less than 0.016, preferably less than or equal to 0.01. See, for example, U.S. Pat. No. 5,952,538, which is herein fully incorporated by reference.

In another embodiment of the process for converting an oxygenate such as methanol to one or more olefin(s) using a molecular sieve catalyst composition, the WHSV is from 0.01 hr$^{-1}$ to about 100 hr$^{-1}$, at a temperature of from about 350° C. to 550° C., and silica to $Me_2O_3$ (Me is a Group IIIA or VIII element from the Periodic Table of Elements) molar ratio of from 300 to 2500. See, for example, EP-0 642 485 B1, which is herein fully incorporated by reference.

Other processes for converting an oxygenate such as methanol to one or more olefin(s) using a molecular sieve catalyst composition are described in WO 01/23500 published Apr. 5, 2001 (propane reduction at an average catalyst feedstock exposure of at least 1.0), which is herein incorporated by reference.

The coked molecular sieve catalyst composition is withdrawn from the disengaging vessel, preferably by one or more cyclones(s), and introduced to the regeneration system. The regeneration system comprises a regenerator where the coked catalyst composition is contacted with a regeneration medium, preferably a gas containing oxygen, under general regeneration conditions of temperature, pressure and residence time.

Non-limiting examples of the regeneration medium include one or more of oxygen, $O_3$, $SO_3$, $N_2O$, NO, $NO_2$, $N_2O_5$, air, air diluted with nitrogen or carbon dioxide, oxygen and water (U.S. Pat. No. 6,245,703), carbon monoxide and/or hydrogen. The regeneration conditions are those capable of burning coke from the coked catalyst composition, preferably to a level less than 0.5 weight percent based on the total weight of the coked molecular sieve catalyst composition entering the regeneration system. The coked molecular sieve catalyst composition withdrawn from the regenerator forms a regenerated molecular sieve catalyst composition.

The regeneration temperature is in the range of from about 200° C. to about 1500° C., preferably from about 300° C. to about 1000° C., more preferably from about 450° C. to about 750° C., and most preferably from about 550° C. to 700° C. The regeneration pressure is in the range of from about 15 psia (103 kPa) to about 500 psia (3448 kPa), preferably from about 20 psia (138 kPa) to about 250 psia (1724 kPa), more preferably from about 25 psia (172 kPa) to about 150 psia (1034 kPa), and most preferably from about 30 psia (207 kPa) to about 60 psia (414 kPa).

The preferred residence time of the molecular sieve catalyst composition in the regenerator is in the range of from about one minute to several hours, most preferably about one minute to 100 minutes, and the preferred volume of oxygen in the gas is in the range of from about 0.01 mole percent to about 5 mole. percent, based on the total volume of the gas.

In one embodiment, regeneration promoters, typically metal-containing compounds such as platinum, palladium and the like, are added to the regenerator directly, or indirectly, for example with the coked catalyst composition. Also, in another embodiment, a fresh molecular sieve catalyst composition is added to the regenerator containing a regeneration medium of oxygen and water as described in U.S. Pat. No. 6,245,703, which is herein fully incorporated by reference.

In an embodiment, a portion of the coked molecular sieve catalyst composition from the regenerator is returned directly to the one or more riser reactor(s), or indirectly, by pre-contacting with the feedstock, or contacting with fresh molecular sieve catalyst composition, or contacting with a regenerated molecular sieve catalyst composition or a cooled regenerated molecular sieve catalyst composition described below.

The burning of coke is an exothermic reaction, and in an embodiment, the temperature within the regeneration system is controlled by various techniques in the art including feeding a cooled gas to the regenerator vessel, operated either in a batch, continuous, or semi-continuous mode, or a combination thereof A preferred technique involves withdrawing the regenerated molecular sieve catalyst composition from the regeneration system and passing the regenerated molecular sieve catalyst composition through a catalyst cooler that forms a cooled regenerated molecular sieve catalyst composition. The catalyst cooler, in an embodiment, is a heat exchanger that is located either internal or external to the regeneration system.

In one embodiment, the cooler regenerated molecular sieve catalyst composition is returned to the regenerator in a continuous cycle. Alternatively, (see U.S. patent application Ser. No. 09/587,766 filed Jun. 6, 2000) a portion of the cooled regenerated molecular sieve catalyst composition is returned to the regenerator vessel in a continuous cycle, and another portion of the cooled molecular sieve regenerated molecular sieve catalyst composition is returned to the riser reactor(s), directly or indirectly, or a portion of the regenerated molecular sieve catalyst composition or cooled regenerated molecular sieve catalyst composition is contacted with by-products within the gaseous effluent (WO 00/49106 published Aug. 24, 2000), which are all herein fully incorporated by reference. In another embodiment, a regenerated molecular sieve catalyst composition contacted with an alcohol, preferably ethanol, 1-propanol, 1-butanol or a mixture thereof, is introduced to the reactor system, as described in U.S. patent application Ser. No. 09/785,122 filed Feb. 16, 2001, which is herein fully incorporated by reference.

Other methods for operating a regeneration system are in disclosed U.S. Pat. No. 6,290,916 (controlling moisture), which is herein fully incorporated by reference.

The regenerated molecular sieve catalyst composition withdrawn from the regeneration system, preferably from the catalyst cooler, is combined with a fresh molecular sieve catalyst composition and/or re-circulated molecular sieve catalyst composition and/or feedstock and/or fresh gas or liquids, and returned to the riser reactor(s). In another embodiment, the regenerated molecular sieve catalyst composition withdrawn from the regeneration system is returned to the riser reactor(s) directly, preferably after passing through a catalyst cooler. In one embodiment, a carrier, such as an inert gas, feedstock vapor, steam or the like, semi-continuously or continuously, facilitates the introduction of the regenerated molecular sieve catalyst composition to the reactor system, preferably to the one or more riser reactor(s).

By controlling the flow of the regenerated molecular sieve catalyst composition or cooled regenerated molecular sieve catalyst composition from the regeneration system to the reactor system, the optimum level of coke on the molecular sieve catalyst composition entering the reactor is maintained. There are many techniques for controlling the flow of a molecular sieve catalyst composition described in Michael Louge, *Experimental Techniques, Circulating Fluidised Beds, Grace, Avidan and Knowlton*, eds. Blackie, 1997 (336–337), which is herein incorporated by reference.

Coke levels on the molecular sieve catalyst composition are measured by withdrawing from the conversion process the molecular sieve catalyst composition at a point in the process and determining its carbon content. Typical levels of coke on the molecular sieve catalyst composition, after regeneration is in the range of from 0.01 weight percent to about 15 weight percent, preferably from about 0.1 weight percent to about 10 weight percent, more preferably from about 0.2 weight percent to about 5 weight percent, and most preferably from about 0.3 weight percent to about 2 weight percent, based on the total weight of the molecular sieve and not the total weight of the molecular sieve catalyst composition.

In one preferred embodiment, the mixture of fresh molecular sieve catalyst composition and regenerated molecular sieve catalyst composition and/or cooled regenerated molecular sieve catalyst composition contains in the range of from about 1 to 50 weight percent, preferably from about 2 to 30 weight percent, more preferably from about 2 to about 20 weight percent, and most preferably from about 2 to about 10 weight percent coke or carbonaceous deposit, based on the total weight of the mixture of molecular sieve catalyst compositions. See, for example, U.S. Pat. No. 6,023,005, which is herein fully incorporated by reference.

The gaseous effluent is withdrawn from the disengaging system and is passed through a recovery system. There are many well-known recovery systems, techniques and sequences that are useful in separating olefin(s) and purifying olefin(s) from the gaseous effluent. Recovery systems generally comprise one or more or a combination of a various separation, fractionation and/or distillation towers, columns, splitters, or trains, reaction systems such as ethylbenzene manufacture (U.S. Pat. No. 5,476,978) and other derivative processes such as aldehydes, ketones and ester manufacture (U.S. Pat. No. 5,675,041), and other associated equipment, for example, various condensers, heat exchangers, refrigeration systems or chill trains, compressors, knock-out drums or pots, pumps, and the like.

The metalloaluminophosphate molecular sieve materials and catalyst compositions of the present invention may be used in the manufacture of alkylamines, using ammnonia. Examples of suitable processes are as described in published European Patent Application EP 0 993 867 A1, and in U.S. Pat. No. 6,153,798 to Hidaka et.al, which are herein fully incorporated by reference.

In order to provide a better understanding of the present invention including representative advantages thereof, the following examples are offered.

EXAMPLES

XRD

X-ray Powder Diffractograms were recorded on Siemens D500 diffractometer with voltage of 40 kV and current of 30 mA, using a Cu target and Ni-filter ($\lambda$=0.154 nm). Elemental analysis of Al, Si, and P was performed using Inductively Coupled Plasma (ICP) spectroscopy. Unless specified otherwise, XRD analysis was performed on samples that have been dried at a temperature of from 50° C. to 60° C. in a vacuum oven.

Example 1

Preparation of [Si—Al—P—O]—CHA Using N-methylethanolamine as Template

The following ingredients were mixed, in sequence, and blended into a uniform gel using a microhomogenizer (Tissue Tearor Model 98730 available from Biospec Products, Inc, USA): 85 wt % $H_3PO_4$ (7.38 grams) (obtained from Aldrich Chemical Company), $H_2O$ (14.05 grams), Cabosil™ (0.56 grams) (fumed silica available from Cabot Corporation, Illinois, USA), Catapal™ (3.84 grams) (71.5 wt % $Al_2O_3$, available from CONDEA Vista Company, Texas, USA), and then N-methylethanolamine (MEA) (4.18 grams) (obtained from Aldrich Chemical Company, USA). The molar ratio of the ingredients was as follows:

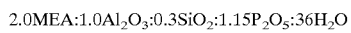

2.0MEA:1.0$Al_2O_3$:0.3$SiO_2$:1.15$P_2O_5$:36$H_2O$

The gel was divided into two equal portions and placed into two 30 mL Parr™ bombs with Teflon™ liners, and heated to 170° C. for 3 and 14 days under static conditions. After cooling, the solid products were centrifuged and washed five times with deionized water, and then dried in a 60° C. vacuum oven overnight. X-ray powder patterns of the products are shown in FIG. 1. The X-ray powder patterns show that the product obtained after 3 days of crystallization was largely amorphous, whilst the product obtained after 14 days of crystallization was [Si—Al—P—O]—CHA with some crystalline impurities. The resultant product after 14 days of crystallization was a SAPO of the CHA framework type, comprising N-methylethanolamine within its intracrystalline structure.

This synthesis was repeated in an identical fashion except that the following starting gel composition was used:

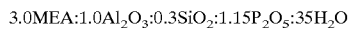

3.0MEA:1.0$Al_2O_3$:0.3$SiO_2$:1.15$P_2O_5$:35$H_2O$

Figure 2:
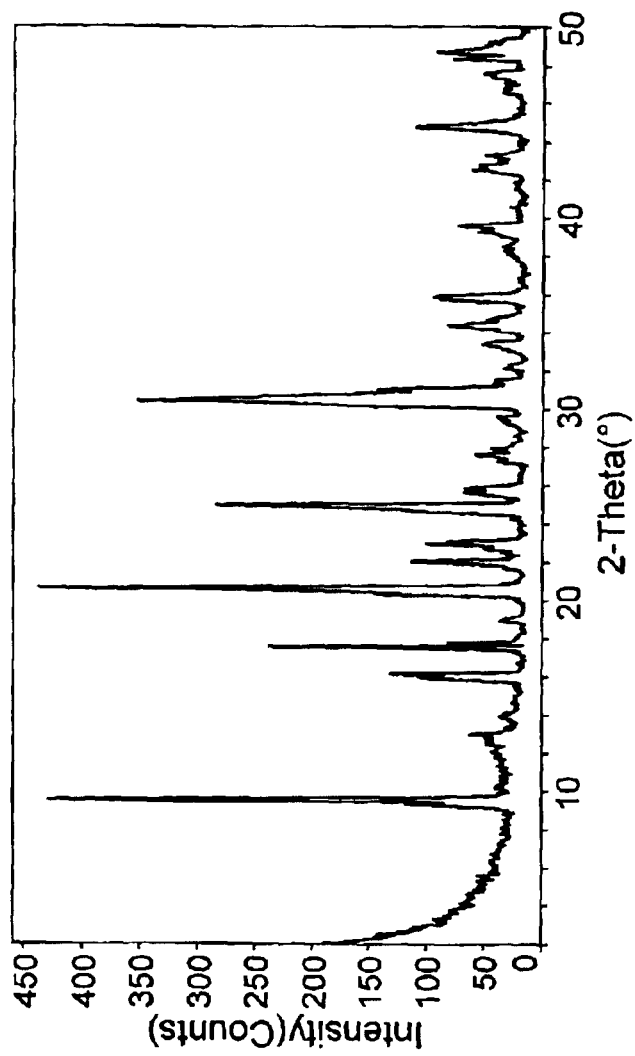
FIG. 2 shows the XRD pattern of a crystalline SAPO molecular sieve of framework type CHA comprising N-methylethanolamine within its intra-crystalline structure.

After 14 days of crystallization, the resultant product was pure [Si—Al—P—O]—CHA as determined by XRD; the X-Ray powder pattern is shown in FIG. 2. The product was obtained in a yield of 4.2 wt % and elemental analysis showed that the product had the following composition: $Al_{1.0}Si_{0.324}P_{0.717}$, which corresponds to 1.94 Si/CHA cage.

This synthesis was repeated in an identical fashion except that the following starting gel composition was used:

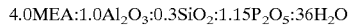

4.0MEA:1.0$Al_2O_3$:0.3$SiO_2$:1.15$P_2O_5$:36$H_2O$

No solid product was obtained after the same crystallization procedure. This Example shows that under specific conditions SAPOs having CHA framework type may be synthesised with MEA as the sole template. The resultant pure SAPOs have relatively high Si/CHA cage values.

Example 2

Preparation of [Si—Al—P—O]—CHA Using N-methylethanolamine (MEA) and Tetraethylammonium Chloride (TEACl) as Templates The following ingredients were mixed, in sequence, and blended into a uniform gel using a microhomogenizer (Tissue Tearor Model 98730 available from Biospec Products, Inc, USA): 85 wt % $H_3PO_4$ (6.66 grams) (obtained from Aldrich Chemical Company), $H_2O$ (11.08 grams), Ludox™ AS40 (1.13 grams) (40% $SiO_2$), Catapal™ (3.74 grams) (71.5 wt % $Al_2O_3$, available from CONDEA Vista Company, Texas, USA), then N-methylethanolamine (MEA) (4.38 grams) (obtained from Aldrich Chemical Company, USA) and then tetraethylammonium chloride (TEACl) (2.56 grams). The molar ratio of the ingredients was as follows:

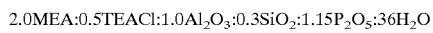

2.0MEA:0.5TEACl:1.0$Al_2O_3$:0.3$SiO_2$:1.15$P_2O_5$:36$H_2O$

Figure 3:
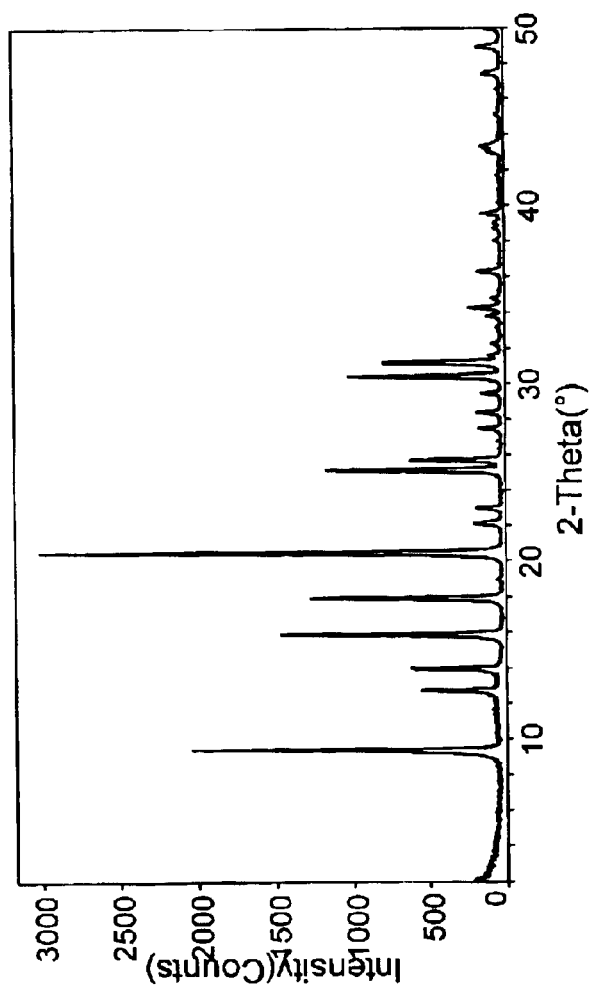
FIG. 3 shows the XRD pattern of a crystalline SAPO molecular sieve of framework type CHA obtained using a mixed template comprising N-methylethanolamine and tetraethylammonium chloride.

The gel was divided into two equal portions and placed into two 30 mL Parr™ bombs with Teflon™ liners, and heated to 170° C. for 2 days whilst being tumbled at 20 rpm. After cooling, the solid products were centrifuged and washed five times with deionized water, and then dried in a 60° C. vacuum oven overnight. X-ray powder patterns of the product are shown in FIG. 3. The X-ray powder pattern shows that the product was pure [Si—Al—P—O]—CHA. Elemental analysis of the product obtained after 2 days of crystallization gives the following results: $Al_{1.0}Si_{0.160}P_{0.818}$, which corresponds to a Si level of 0.96 Si/CHA cage. This Example shows that MEA may be used in combination with known templates for [Si—Al—P—O]—CHA to provide materials with relatively low levels of Si/CHA cage.

Example 3

Preparation of [Si—Al—P—O]—CHA Using N-methylethanolamine (MEA) as Template and HPF$_6$ as a Source of Fluoride

The following ingredients were mixed, in sequence, and blended into a uniform gel using an electric blender: 85 wt % $H_3PO_4$ (44.48 grams) (obtained from Aldrich Chemical Company), $H_2O$ (77.56 grams), Catapal™ (23.15 grams) (74 wt % $Al_2O_3$, available from CONDEA Vista Company, Texas, USA) Cabosil™ (1.12 grams) (fumed silica available from Cabot Corporation, Illinois, USA-10% $H_2O$), then 25% HPF$_6$ (9.79 grams) and then N-methylethanolamine (MEA) (18.90 grams) (obtained from Aldrich Chemical Company, USA). The molar ratio of the ingredients was as follows:

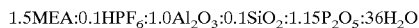

1.5MEA:0.1HPF$_6$:1.0Al$_2$O$_3$:0.1SiO$_2$:1.15P$_2$O$_5$:36H$_2$O

Figure 4:
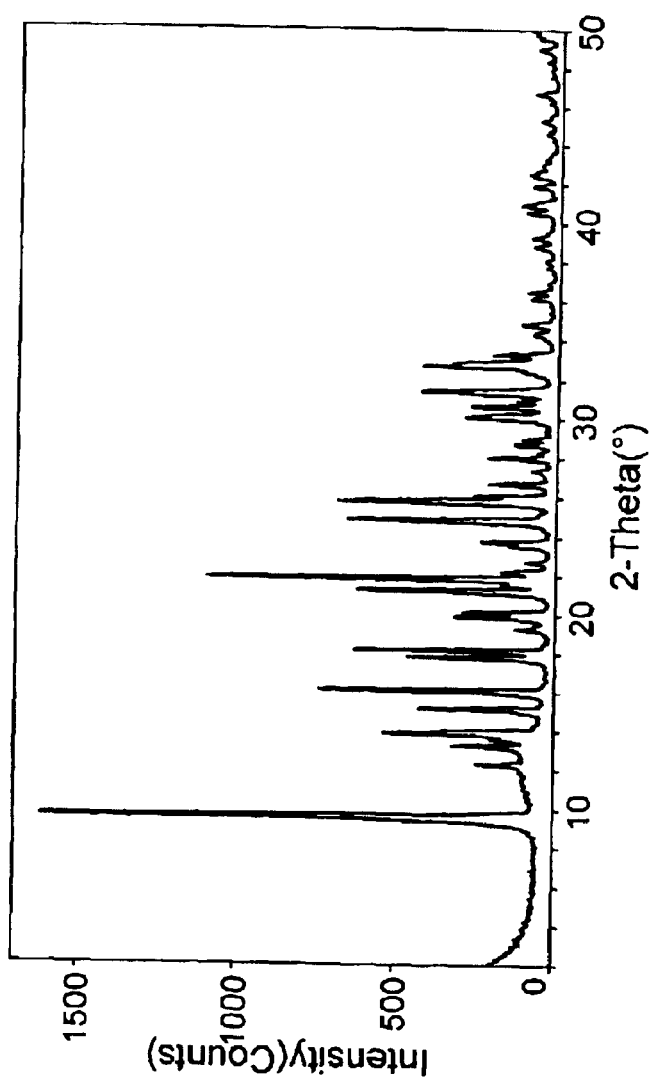
FIG. 4 shows the XRD pattern of a crystalline SAPO molecular sieve of framework type CHA comprising N-methylethanolamine and fluoride within its intra-crystalline structure.

The gel was placed into a 300 mL stainless steel Parr™ bomb equipped with a mechanical stirrer. The bomb was heated to 170° C. with a ramping rate of 10° C./hour and was held at 170° C. for 20 hours whilst the mechanical stirrer was operated at 240 rpm. After cooling, the solid product was centrifuged and washed with deionized water until the conductivity of the supernatant was below 50 μS/cm, and then dried in a 60° C. vacuum oven overnight. The yield of the synthesis defined as the wt % of the dried solid product obtained from the weight of the synthesis gel was exceptionally high at 27.1%. Without being bound by any theory, it is believed that it is in part the combination of the source of fluoride with relatively low ratio of MEA to alumina that results in such an exceptionally high yield. X-ray powder patterns of the uncalcined product is shown in FIG. 4, which is a unique XRD pattern. The product was calcined and immediately analyzed by XRD, but with no precaution to avoid exposure to moisture, and was found to have the CHA framework type. This confirms that the low silica materials obtained with N-methylethanolamine template and a source of fluoride have a CHA framework type, even though the uncalcined materials exhibit a different and unique XRD pattern. Elemental analysis of the product gave the following results: $Al_{1.0}Si_{0.051}P_{1.004}$, which corresponds to a Si level of 0.31 Si/CHA cage. This Example shows that MEA may be used in combination with a source of fluoride to produce low Si/CHA cage products in exceptionally high yield.

Example 4

Preparation of [Al—P—O]—CHA Using N-methylethanolamine (MEA) as Template and HF as a Source of Fluoride

The following ingredients were mixed, in sequence, and blended into a uniform gel using a microhomogenizer (Tissue Tearor Model 98730 available from Biospec Products, Inc, USA): 85 wt % $H_3PO_4$ (10.04 grams) (obtained from Aldrich Chemical Company), $H_2O$ (22.53 grams), Catapal™ (5.23 grams) (74 wt % $Al_2O_3$, available from CONDEA Vista Company, Texas, USA), N-methylethanolamine (MEA) (5.69 grams) (obtained from Aldrich Chemical Company, USA) and then 50% HF (1.51 grams). The molar ratio of the ingredients was as follows:

2.0MEA:1.0HF:1.0Al$_2$O$_3$:1.15P$_2$O$_5$:40H$_2$O

Figure 5:
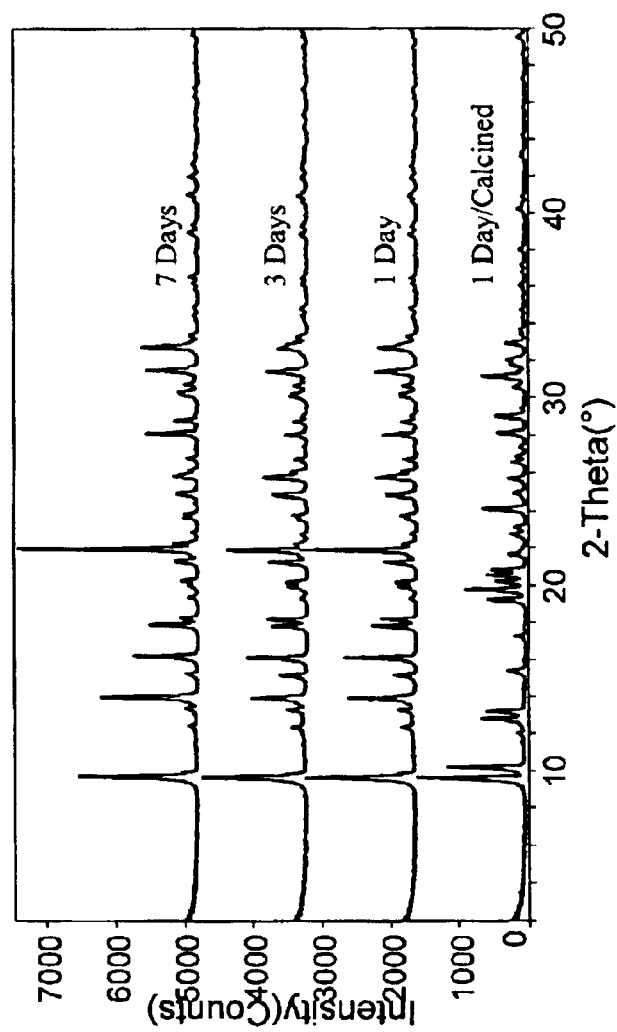
FIG. 5 shows the XRD pattern of an AlPO molecular sieve gel after 1, 5 and 7 days crystallization at 170° C. under static conditions, and the XRD pattern of the sample obtained after 1 day of crystallization after calcination.

The gel was then divided into three equal portions and placed into three 30 mL Parr™ bombs with Teflon™ liners. The bombs were heated to 170° C. for 1, 5 and 7 days under static conditions. After cooling, the solid products were centrifuged and washed five times with deionized water and then dried in a 60° C. vacuum oven overnight The X-ray powder patterns of the three products are shown in FIG. 5, which is a unique XRD pattern. The product that was obtained after 1 day of crystallization was calcined in air at 600° C. for three hours and an XRD pattern was recorded with no precaution to avoid exposure to moisture. The XRD pattern is identifiable from the literature as AlPO$_4$-34. This confirms that the as synthesized samples which exhibit unique XRD patterns that show no similarity to known [Si—Al—P—O]—CHA with trigonal symmetry (e.g. SAPO-34) are revealed to be of CHA framework type. This Example shows that MEA may be used in combination with a source of fluoride to produce [Al—P—O]—CHA.

Example 5

Preparation of [Al—P—O]—CHA Using Higher Mole Ratio of N-methylethanolamine (MEA) as Template and HF as a Source of Fluoride

The procedure of Example 4 was repeated, but the molar ratios were adjusted to the following:

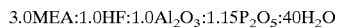

3.0MEA:1.0HF:1.0Al$_2$O$_3$:1.15P$_2$O$_5$:40H$_2$O

The resultant product was found to be a mixture of [Al—P—O]—CHA and [Al—P—O]—AWO (AlPO$_4$-21).

Example 6

Preparation of [Al—P—O]—CHA Using Lower Mole Ratio of N-methylethanolamine (MEA) as Template and HF as a Source of Fluoride

The procedure of Example 4 was repeated, but the molar ratios were adjusted to the following:

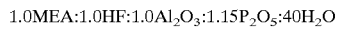

1.0MEA:1.0HF:1.0Al$_2$O$_3$:1.15P$_2$O$_5$:40H$_2$O

The resultant product was found to be a mixture of [Al—P—O]—AWO and AlPO$_4$ of berlinite structure.

Examples 4, 5 and 6 demonstrate that for the production of pure [Al—P—O]—CHA when using MEA and a source of fluoride, the amount of MEA used should be controlled.

All patents, test procedures, and other documents cited herein, including priority documents, are fully incorporated herein by reference to the extent such disclosure is not inconsistent with this invention and for all jurisdictions in which such incorporation is permitted.

What is claimed is:

1. A process for preparing microporous crystalline aluminophosphate or silicoaluminophosphate molecular sieves of CHA framework type, the process comprising:
   (a) forming a reaction mixture comprising a source of aluminum, a source of phosphorus, optionally a source of silicon, and at least one template, the template comprising N-methylethanolamine;

(b) inducing crystallization of at least one of aluminophosphate and silicoaluminophosphate from the reaction mixture; and (c) recovering at least one of aluminophosphate and silicoaluminophosphate molecular sieve, wherein the mole ratio of the template to aluminum in the reaction mixture is greater than 0.05.

2. The process of claim 1, further comprising the step of (d) calcining the at least one of aluminophosphate and silicoaluminophosphate molecular sieve.

3. The process of claim 1, wherein the reaction mixture further comprises a source of fluoride.

4. The process of claim 3, wherein the source of fluoride is hydrogen fluoride.

5. The process of claim 3, wherein the source of fluoride is at least one fluorine-containing compound comprising two or more fluorine substituents and capable of providing fluoride ions.

6. The process of claim 5, wherein the fluorine-containing compound is selected from the group consisting of $[(C_2H_5)_4N]PF_6$, $NaHF_2$, $(NH_4)HF_2$, $HPF_6$, $NH_4PF_6$, $H_2SiF_6$, $(NH_4)_2SiF_6$, $NH_4HF_2$, $NaPF_6$, anhydrous $AlF_3$, $AlF_3$ hydrate, $(NH_4)_3AlF_6$, $(NH_4)_2TiF_6$, $(NH_4)_2ZrF_6$, $(NH_4)_2GeF_6$, $(NH_4)_2SnF_6$ and mixtures thereof.

7. The process of claim 6, wherein the fluorine-containing compound is selected from the group consisting of $(NH_4)_2SiF_6$, $NH_4HF_2$, $HPF_6$, $H_2SiF_6$, anhydrous $AlF_3$, $AlF_3$ hydrate, $NH_4PF_6$, $NaPF_6$ and mixtures thereof.

8. The process of claim 7, wherein the fluorine-containing compound is selected from the group consisting of $(NH_4)_2SiF_6$, $HPF_6$, $H_2SiF_6$, anhydrous $AlF_3$, $AlF_3$ hydrate, $NH_4PF_6$ and mixtures thereof.

9. The process of claim 8, wherein the fluorine-containing compound is selected from the group consisting of $[NH_4]PF_6$, $HPF_6$ and mixtures thereof.

10. The process of claim 3, wherein the mole ratio of fluoride to aluminum in the reaction mixture is within the range 0.05 to 0.75.

11. The process of claim 10, wherein the range is 0.05 to 0.5.

12. The process of claim 3, wherein the mole ratio of fluoride to template in the reaction mixture is within the range 0.033 to 1.5.

13. The process of claim 12, wherein the range is 0.1 to 1.0.

14. The process of claim 1, wherein N-methylethanolamine is the sole nitrogen-containing template, and the mole ratio of N-methylethanolamine to aluminum in the reaction mixture is greater than 0.5.

15. The process of claim 14, wherein the mole ratio of N-methylethanolamine to aluminum in the reaction mixture is 0.75 or greater.

16. The process of claim 15, wherein the mole ratio of N-methylethanolamine to aluminum in the reaction mixture is 1.0 or greater.

17. The process of claim 14, wherein the mole ratio of N-methylethanolamine to aluminum in the reaction mixture is 2.0 or less.

18. The process of claim 15, wherein the mole ratio of N-methylethanolamine to aluminum in the reaction mixture is 2.0 or less.

19. The process of claim 16, wherein the mole ratio of N-methylethanolamine to aluminum in the reaction mixture is 2.0 or less.

20. The process of claim 14, wherein the mole ratio of N-methylethanolamine to aluminum in the reaction mixture is 1.75 or less.

21. The process of claim 15, wherein the mole ratio of N-methylethanolamine to aluminum in the reaction mixture is 1.75 or less.

22. The process of claim 16, wherein the mole ratio of N-methylethanolamine to aluminum in the reaction mixture is 1.75 or less.

23. The process of claim 14, wherein the mole ratio of N-methylethanolamine to aluminum in the reaction mixture is 1.5 or less.

24. The process of claim 15, wherein the mole ratio of N-methylethanolamine to aluminum in the reaction mixture is 1.5 or less.

25. The process of claim 16, wherein the mole ratio of N-methylethanolamine to aluminum in the reaction mixture is 1.5 or less.

26. The process of claim 1, wherein the template further comprises one or more of tetraethyl ammonium hydroxide, tetraethyl ammonium phosphate, tetraethyl ammonium fluoride, tetraethyl ammonium bromide, tetraethyl ammonium chloride, tetraethyl ammonium acetate, dipropylamine, isopropylamine, cyclohexylamine, morpholine, methylbutylamine, morpholine, diethanolamine and triethylamine.

27. The process of claim 1, wherein the template further comprises one or more of tetraethyl ammonium hydroxide, tetraethyl ammonium phosphate, tetraethyl ammonium fluoride, tetraethyl ammonium bromide, tetraethyl ammonium chloride and tetraethyl ammonium acetate.

28. The process of claim 26, wherein the mole ratio of N-methylethanolamine to aluminum in the reaction mixture is 0.05 or greater.

29. The process of claim 28, wherein the mole ratio of N-methylethanolamine to aluminum in the reaction mixture is 0.075 or greater.

30. The process of claim 29, wherein the mole ratio of N-methylethanolamine to aluminum in the reaction mixture is 0.1 or greater.

31. The process of claim 30, wherein the mole ratio of N-methylethanolamine to aluminum in the reaction mixture is 0.125 or greater.

32. The process of claim 31, wherein the mole ratio of N-methylethanolamine to aluminun in the reaction mixture is 0.5 or greater.

33. The process of claim 32, wherein the mole ratio of N-methylethanolamine to aluminum in the reaction mixture is 0.75 or greater.

34. The process of claim 33, wherein the mole ratio of N-methylethanolamine to aluminum in the reaction mixture is 1.0 or greater.

35. The process of claim 26, wherein the mole ratio of total template to aluminum is 2.0 or less.

36. The process of claim 35, wherein the mole ratio of total template to aluminum is 1.75 or less.

37. The process of claim 36, wherein the mole ratio of total template to aluminum is 1.5 or less.

38. The process of claim 1, wherein the molecular sieve has a Si/CHA cage ratio of from 0.01 to 1.0.

39. The process of claim 38, wherein the Si/CHA cage ratio is from 0.05 to 0.50.

40. The process of claim 39, wherein the Si/CHA cage ratio is from 0.10 to 0.45.

41. A process for preparing microporous crystalline aluminophosphate or silicoaluminophosphate molecular sieves of CHA framework type, the process comprising:

(a) forming a reaction mixture comprising a source of aluminum, a source of phosphorus, optionally a source of silicon, and N-methylethanolamine as the sole nitrogen-containing template;

(b) inducing crystallization of at least one of aluminophosphate and silicoaluminophosphate from the reaction mixture; and (c) recovering at least one of aluminophosphate and silicoaluminophosphate molecular sieve, wherein the mole ratio of N-methylethanolamine to aluminum in the reaction mixture is greater than 0.5.

42. A process for preparing microporous crystalline aluminophosphate or silicoaluminophosphate molecular sieves of CHA framework type, the process comprising:

(a) forming a reaction mixture comprising a source of aluminum, a source of phosphorus, optionally a source of silicon, a first template comprising N-methylethanolamine and at least a second template different from the first template;

(b) inducing crystallization of at least one of aluminophosphate and silicoaluminophosphate from the reaction mixture; and (c) recovering at least one of aluminophosphate and silicoaluminophosphate molecular sieve, wherein the mole ratio of the N-methylethanolamine to aluminum in the reaction mixture is greater than 0.05.

43. The process of claim 42, wherein the second template comprises one or more of tetraethyl ammonium hydroxide, tetraethyl ammonium phosphate, tetraethyl ammonium fluoride, tetraethyl ammonium bromide, tetraethyl ammonium chloride, tetraethyl ammonium acetate, dipropylamine, isopropylamine, cyclohexylamine, morpholine, methylbutylamine, morpholine, diethanolamine and triethylamine.

44. An aluminophosphate or silicoaluminophosphate molecular sieve, substantially of framework type CHA, comprising within its intra-crystalline structure N-methylethanolamine.

45. The molecular sieve of claim 44, wherein the molecular sieve has a Si/CHA cage ratio of from 0.01 to 1.0.

46. The molecular sieve of claim 45, wherein the Si/CHA cage ratio is from 0.05 to 0.50.

47. The molecular sieve of claim 46, wherein the Si/CHA cage ratio is from 0.1 to 0.45.

48. The molecular sieve of claim 44, further comprising fluoride within its intra-crystalline structure.

49. A microporous crystalline silicoaluminophosphate molecular sieve having a characteristic X-ray powder diffraction pattern containing at least the d-spacings as set forth in Table I.

50. The molecular sieve of claim 49, comprising N-methylethanolamine within its intra-crystalline structure.

51. A microporous crystalline silicoaluminophosphate molecular sieve having a characteristic X-ray powder diffraction pattern containing at least the d-spacings as set forth in Table II.

52. The molecular sieve of claim 51, comprising N-methylethanolamine and fluoride within its intra-crystalline structure.

53. A process for forming a catalyst composition, the process comprising forming a mixture comprising:

(i) at least one aluminophosphate or silicoaluminophosphate molecular sieve, substantially of framework type CHA, comprising within its intra-crystalline structure N-methylethanolamine; and (ii) at least one formulating agent.

54. A formulated molecular sieve composition comprising:

(i) at least one aluminophosphate or silicoaluminophosphate molecular sieve, substantially of framework type CHA, comprising within its intra-crystalline structure N-methylethanolamine; and (ii) at least one formulating agent.

55. The formulated molecular sieve composition of claim 54, wherein the formulating agent is one or more materials selected from the group consisting of binding agents, matrix or filler materials, catalytically active materials and mixtures thereof.

56. The formulated molecular sieve composition of claim 54, wherein the molecular sieve has a Si/Al ratio of from 0.01 to 0.1.

57. The formulated molecular sieve composition of claim 56, wherein the Si/Al ratio is from 0.02 to 0.08.

58. The formulated molecular sieve composition of claim 57, wherein the Si/Al ratio is from 0.02 to 0.07.

59. The formulated molecular sieve composition of claim 54, wherein the molecular sieve has a Si/CHA cage ratio of from 0.01 to 1.0.

60. The formulated molecular sieve composition of claim 59, wherein the Si/CHA cage ratio is 0.05 to 0.50.

61. The formulated molecular sieve composition of claim 60, wherein the Si/CHA cage ratio is from 0.10 to 0.45.

* * * * *